(12) United States Patent
Takatsu (10) Patent No.: US 11,231,908 B2
(45) Date of Patent: Jan. 25, 2022

(54) RANDOM NUMBER GENERATION DEVICE AND RANDOM NUMBER GENERATION METHOD

(71) Applicant: FUJITSU LIMITED, Kawasaki (JP)

(72) Inventor: Motomu Takatsu, Shinjuku (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/923,150

(22) Filed: Jul. 8, 2020

(65) Prior Publication Data

US 2021/0019117 A1 Jan. 21, 2021

(30) Foreign Application Priority Data

Jul. 17, 2019 (JP) .............................. JP2019-131765

(51) Int. Cl.
G06F 7/58 (2006.01)
G06F 17/14 (2006.01)

(52) U.S. Cl.
CPC ............ G06F 7/582 (2013.01); G06F 17/145 (2013.01)

(58) Field of Classification Search
CPC ........... G06F 7/58; G06F 7/582; G06F 17/145
USPC .................................................. 708/250, 253
See application file for complete search history.

(56) References Cited

U.S. PATENT DOCUMENTS

| | | | | |
|---|---|---|---|---|
| 2004/0006581 A1* | 1/2004 | Nakayama | ............ | G06F 17/145 708/400 |
| 2012/0105462 A1 | 5/2012 | Yamakami | | |

FOREIGN PATENT DOCUMENTS

| | | |
|---|---|---|
| JP | S62-017771 A | 1/1987 |
| JP | 2003-323292 A | 11/2003 |
| JP | 2003-323293 A | 11/2003 |
| JP | 2005-038229 A | 2/2005 |
| JP | 2006-293429 A | 10/2006 |
| JP | 2012-094040 A | 5/2012 |

OTHER PUBLICATIONS

Thomas, David B., "The Table-Hadamard GRNG: An Area-Efficient FPGA Gaussian Random Number Generator", ACM Transactions on Reconfigurable Technology and Systems, ACM, US, vol. 8, No. 4, Sep. 24, 2015, pp. 1-22, XP058073048.
Rader, C. M., "A New Method of Generating Gaussian Random Variables by Computer", Massachusetts Institute of Technology, Lincoln Laboratory, Sep. 18, 1969, XP055751242, 35 pages.
Thomas, David B. et al., "Gaussian Random Number Generators", ACM Computing Surveys, ACM, New York, NY, US, vol. 39, No. 4, Nov. 2, 2007, pp. 11.1-11.38, XP058296380.
Extended European Search Report dated Nov. 27, 2020 for corresponding European Patent Application No. 20184874.4, 7 pages.

(Continued)

*Primary Examiner* — Emily E Larocque
(74) *Attorney, Agent, or Firm* — Fujitsu Patent Center (57) ABSTRACT

A random number generation device includes: a pseudo-random number generation circuit configured to generate a plurality of first pseudo-random numbers; and an orthogonal transformation circuit configured to generate a plurality of normal random numbers by performing orthogonal transformation on the plurality of first pseudo-random numbers, or by performing orthogonal transformation on the plurality of first pseudo-random numbers and a second pseudo-random number.

8 Claims, 7 Drawing Sheets

(56) References Cited

OTHER PUBLICATIONS

Makoto Matsumoto et al., "Mersenne Twister: A 623-Dimensionally Equidistributed Uniform Pseudo-Random Number Generator", ACM Transactions on Modeling and Computer Simulation, vol. 8, No. 1, pp. 3-30, Jan. 1998 (Total 28 pages).
Takuya Okuyama et al., "An Ising Computer Based on Simulated Quantum Annealing by Path Integral Monte Carlo Method", IEEE International Conference on Rebooting Computing (ICRC), Nov. 2017 (Total 7 pages).

* cited by examiner

RANDOM NUMBER GENERATION DEVICE AND RANDOM NUMBER GENERATION METHOD

CROSS-REFERENCE TO RELATED APPLICATION

This application is based upon and claims the benefit of priority of the prior Japanese Patent Application No. 2019-131765, fled on Jul. 17, 2019, the entire contents of which are incorporated herein by reference.

FIELD

The embodiment discussed herein is related to a random number generation device and a random number generation method.

BACKGROUND

When information processing is carried out by using a computer, an algorithm corresponding to the processing to be carried out is executed to obtain a target result. Among such cases, in a case where there is a highly efficient deterministic algorithm, the calculation process is often carried out in a relatively short time. Therefore, it is very important to find an efficient deterministic algorithm. However, such an efficient algorithm is present only for some relatively simple problems.

Related art is disclosed in Japanese Laid-open Patent Publication No. 2005-38229, Japanese Laid-open Patent Publication No. 2006-293429 and Japanese Examined Patent Application Publication No. 62-017771.

Non Patent Literature

Related art is disclosed in Matsumoto Makoto, and Nishimura Takuji, "Mersenne Twister: A 623-Dimensionally Equidistributed Uniform Pseudo-Random Number Generator", ACM Transactions on Modeling and Computer Simulation, Vol. 8, No. 1, pp. 3-30, January, 1998, and Okuyama Takuya, Hayashi Masato, and Yamaoka Masanao, "An Ising computer based on simulated quantum annealing by path integral Monte Carlo method", IEEE International Conference on Rebooting Computing (ICRC), November, 2017.

SUMMARY

According to an aspect of the embodiments, a random number generation device includes: a pseudo-random number generation circuit configured to generate a plurality of first pseudo-random numbers; and an orthogonal transformation circuit configured to generate a plurality of normal random numbers by performing orthogonal transformation on the plurality of first pseudo-random numbers, or by performing orthogonal transformation on the plurality of first pseudo-random numbers and a second pseudo-random number.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

As an effective calculation technique applicable to a relatively wide range of problems for which an efficient algorithm is not present, there exists a Monte Carlo method in which calculation processing is carried out by using random numbers, and this method is widely used in numerical calculations (for example, numerical integration), discrete optimization problems, and the like. Since the Monte Carlo method is a method for obtaining expected values by using asymptotic properties of random variables, the method has an advantage that the dependence on the nature of problems is relatively small to be applicable to a wide range of problems; on the other hand, the method has a disadvantage that the calculation time is relatively long because the convergence is slow.

In order to compensate for the disadvantage that the calculation time of the Monte Carlo method is relatively long, it is considered that the algorithm of the method is implemented by hardware to be executed at high speed in parallel, but in this case, a large number of pseudo-random numbers are simultaneously generated in the hardware. In a case where the correlation between the pseudo-random numbers is strong, since the convergence of the expected value is deteriorated, it is desirable to efficiently generate a large number of pseudo-random numbers with a small correlation.

Various kinds of pseudo-random numbers are present in accordance with probability distribution thereof. In the Monte Carlo method, mainly used are a uniform random number having the same probability, a normal random number having a normal distribution, an exponential random number having an exponential distribution, and the like in terms of values in a fixed section. It is relatively easy to efficiently generate a uniform random number by hardware. As a random number generation device configured to generate a uniform random number, a linear-feedback shift register (LFSR), Mersenne Twister extended from the LFSR, and the like are known. However, it is not easy to efficiently generate a normal random number and an exponential random number by hardware.

By software, it is possible to generate a normal random number and an exponential random number relatively simply by making elementary functions (a logarithmic function, a trigonometric function, and a square root) act on a uniform random number. Since central processing units (CPUs) of today are equipped with floating-point arithmetic instructions configured to execute these elementary functions at high speed in most cases, this method is usually used by software. However, in a case of generating a large number of normal random numbers and exponential random numbers in parallel by hardware, the above-discussed method is impractical because a large number of floating-point arithmetic units or conversion tables for the functional calculations are to be used.

As a method of generating a normal random number, there is a method in which the central limit theorem of statistics is used. This theorem is such that, when the mean of a large number of random variables having the same probability distribution (distribution with the same mean value and same variance) is obtained, the distribution thereof converges to a normal distribution as the number of source random variables increases. By using this, it is possible to obtain a normal random number from a uniform random number. By using the nature that an exponential random number is obtained when two normal random numbers each having a mean of 0 and the same variance are squared and added, it is possible to obtain exponential random numbers from normal random numbers by using a relatively small number of arithmetic circuits.

As a random number generation method using the central limit theorem, several techniques are proposed. However, in those techniques, in order to generate one normal random number, a large number of uniform random numbers are used and it is contrived to reduce a correlation between the obtained plurality of normal random numbers.

Further, there is a technique configured to generate more normal random numbers than the number of bits per unit time of a source uniform random number. In this technique, the correlation between random numbers at different times of the same output, and the correlation between random numbers at the same time of different outputs may be reduced; however, since the correlation between random numbers at different times of different outputs remains, this technique is not a technique to generate a large number of normal random numbers with a small correlation.

As a technique to generate an exponential random number from a normal random number, there exists a technique in which two normal random numbers supplied in a longitudinal direction and a lateral direction respectively are squared and added, and as a result an exponential random number is given to cells arranged longitudinally and laterally in a square-like pattern (or a rectangle-like pattern). With this technique, it is possible to decrease the number of normal random numbers (squared) requested to obtain an exponential random number, but there is a problem that the correlation between the exponential random numbers is significantly large (correlation coefficient is about 0.7). Further, conversion by an elementary function is used to obtain the square of the normal random number.

In the technique in which a normal random number is generated by hardware (for example, an addition circuit) based on the central limit theorem, a large number of pseudo-random numbers have to be used to generate a plurality of normal random numbers, thereby raising a problem that the amount of hardware increases. The technique uses about 10 to 1000 uniform random numbers to obtain one normal random number with sufficient precision depending on the utilization.

In one aspect, a random number generation device and a random number generation method able to decrease the number of pseudo-random numbers used for generating a plurality of normal random numbers may be provided.

Embodiments of the present disclosure will be described below with reference to the drawings.

Figure 1:
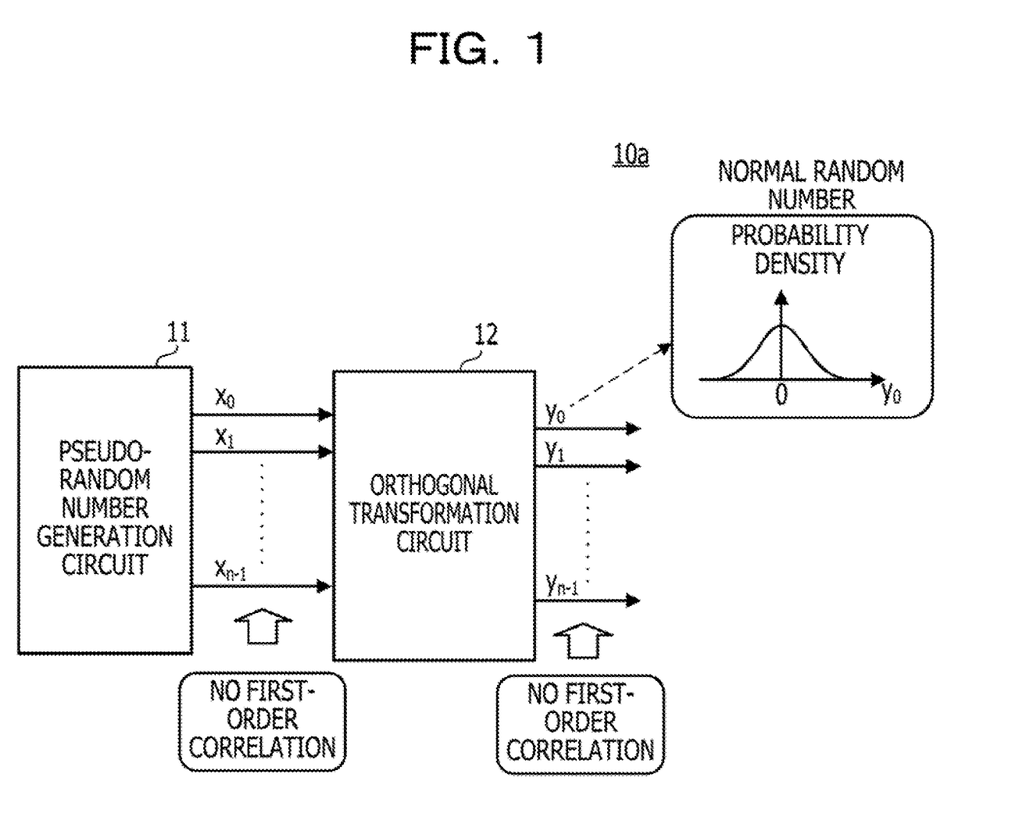
FIG. 1 is a diagram illustrating a configuration example of a random number generation device configured to generate a normal random number.

FIG. 1 is a diagram illustrating a configuration example of a random number generation device configured to generate a normal random number.

A random number generation device $10a$ includes a pseudo-random number generation circuit 11 and an orthogonal transformation circuit 12.

The pseudo-random number generation circuit 11 generates a plurality of (for example, power of 2 pieces) pseudo-random numbers ($x_0, x_1, \ldots, x_{n-1}$). As the pseudo-random number, for example, a uniform random number, a two-value random number, or the like may be used. For example, the pseudo-random number generation circuit 11 generates $x_0, x_1, \ldots, x_{n-1}$ in each predetermined period.

The orthogonal transformation circuit 12 generates a plurality of normal random numbers ($y_0, y_1, \ldots, y_{n-1}$) by performing orthogonal transformation (for example, Hadamard transformation) on the plurality of pseudo-random numbers generated by the pseudo-random number generation circuit 11. For the reason described later, as the number of pseudo-random numbers inputted to the orthogonal transformation circuit 12 increases, each of $y_0$ to $y_{n-1}$ having experienced the orthogonal transformation becomes a random variable that is more normally distributed. FIG. 1 illustrates an example of $y_0$, which is normally distributed. The horizontal axis represents a value of $y_0$, and the vertical axis represents probability density.

As is apparent from the above description, as a flow of a random number generation method by the random number generation device $10a$, the pseudo-random number generation circuit 11 generates first a plurality of pseudo-random numbers, and then the orthogonal transformation circuit 12 performs orthogonal transformation on the plurality of pseudo-random numbers to generate a plurality of normal random numbers.

In the random number generation device $10a$ and the random number generation method discussed above, since the normal random numbers are generated by the orthogonal transformation, the number of normal random numbers to be obtained is equal to the number of pseudo-random numbers generated by the pseudo-random number generation circuit 11. Therefore, it is possible to reduce the number of pseudo-random numbers used for obtaining a plurality of normal random numbers, as compared with a case in which the normal random numbers are generated based on the central limit theorem simply by using an addition circuit or the like. This makes it possible to suppress the amount of hardware of the random number generation device $10a$ to be small.

Further, since the pseudo-random number generation circuit 11 generates a plurality of pseudo-random numbers having no first-order correlation with one another, it is possible to generate a plurality of normal random numbers having no first-order correlation with one another for the reason described later.

An example of the pseudo-random number generation circuit 11 and the orthogonal transformation circuit 12 will be described later.

Figure 2:
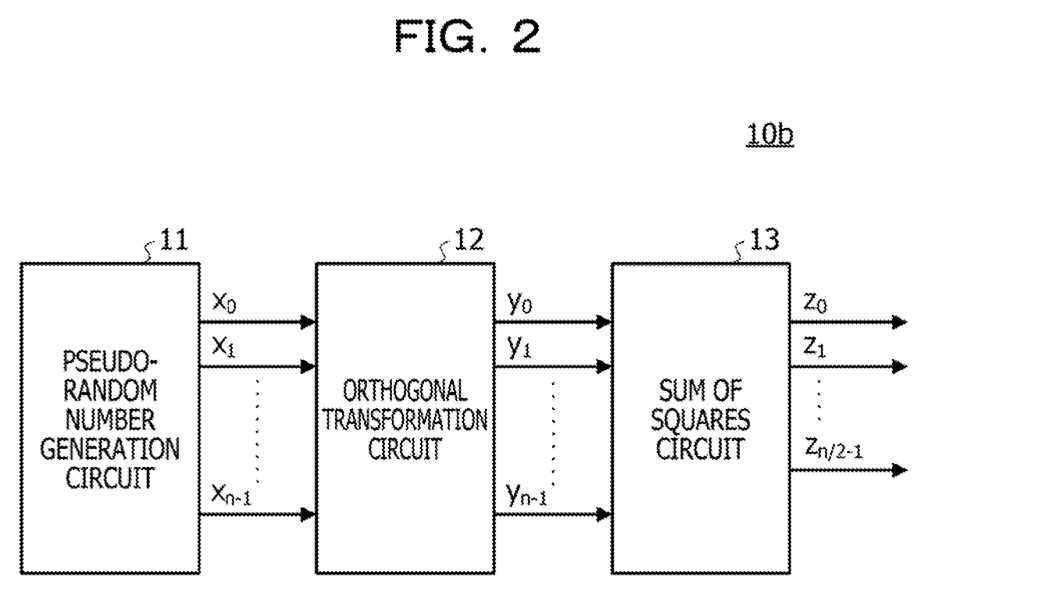
FIG. 2 is a diagram illustrating a configuration example of a random number generation device configured to generate an exponential random number.

FIG. 2 is a diagram illustrating a configuration example of a random number generation device configured to generate an exponential random number. In FIG. 2, the same constituent elements as those illustrated in FIG. 1 are assigned the same reference numerals.

A random number generation device $10b$ Includes a sum of squares circuit 13.

The sum of squares circuit 13 calculates the sum of squares for two each of the plurality of normal random numbers ($y_0, y_1, \ldots, y_{n-1}$) outputted by the orthogonal transformation circuit 12, thereby generating exponential random numbers ($z_0, z_1, \ldots, z_{n/2-1}$) of half the number of normal random numbers.

In this random number generation device 10b, since the number of normal random numbers inputted to the sum of squares circuit 13 may be made equal to the number of pseudo-random numbers generated by the pseudo-random number generation circuit 11, the number of pseudo-random numbers used for obtaining a plurality of exponential random numbers may also be small.

Figure 3:
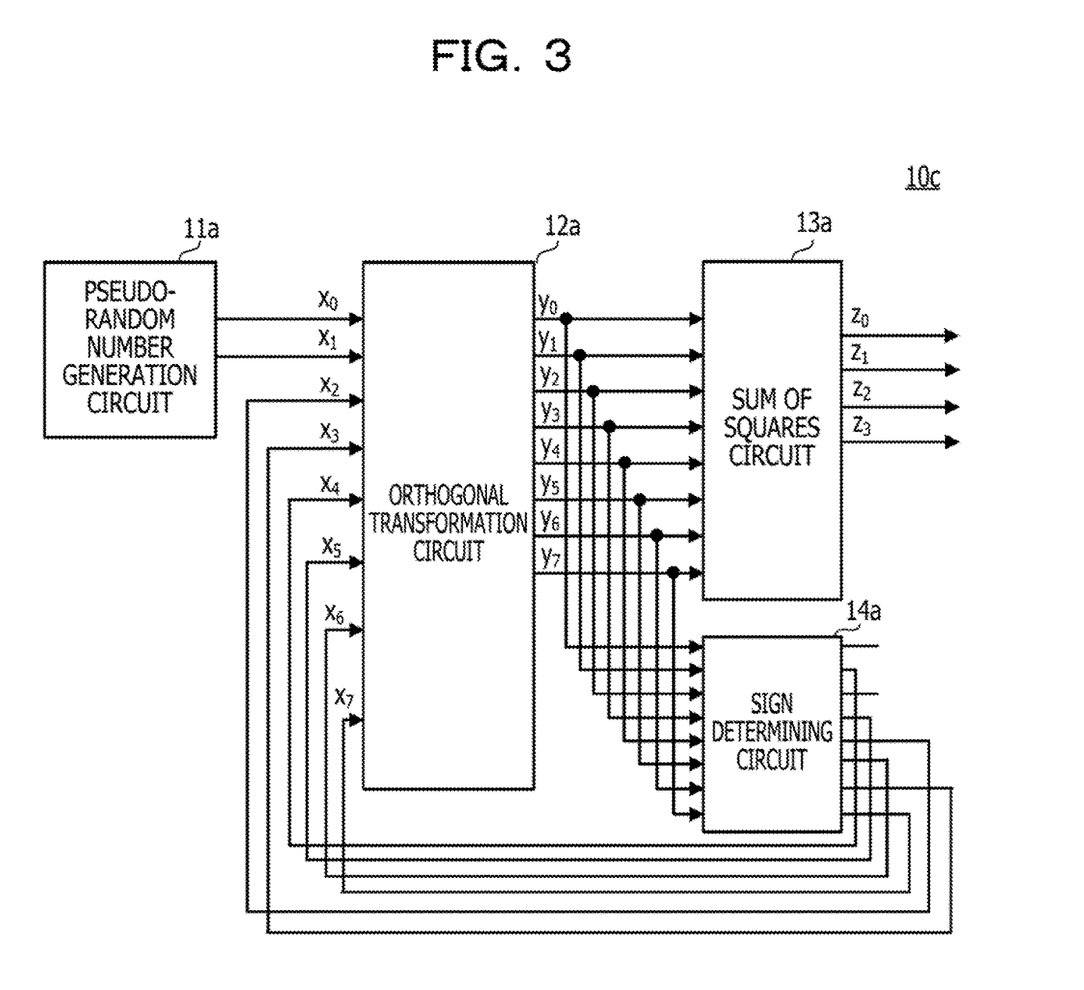
FIG. 3 is a diagram illustrating a configuration example of a random number generation device using feedback.

FIG. 3 is a diagram illustrating a configuration example of a random number generation device using feedback.

In the example illustrated in FIG. 3, In a random number generation device 10c, an orthogonal transformation circuit 12a generates eight normal random numbers ($y_0$ to $y_7$), and a sum of squares circuit 13a generates four exponential random numbers ($z_0$ to $z_3$). Note that these numbers are exemplary, and are not limited thereto.

The random number generation device 10c includes a sign determining circuit 14a.

The sign determining circuit 14a determines a sign of each of the plurality of normal random numbers (including sign bits) outputted by the orthogonal transformation circuit 12a, and outputs a plurality of determination results. For example, the sign determining circuit 14a outputs a determination result of one bit from one normal random number, or a determination result of two bits from a combination of two normal random numbers. Some of the determination results are inputted as pseudo-random numbers to the orthogonal transformation circuit 12a. In the example of FIG. 3, of eight determination results, six results are inputted to the orthogonal transformation circuit 12a as pseudo-random numbers ($x_2$ to $x_7$).

With this, a pseudo-random number generation circuit 11a is able to obtain eight normal random numbers and four exponential random numbers only by generating two pseudo-random numbers ($x_0, x_1$). For example, it is possible to further decrease the number of pseudo-random numbers used to generate a plurality of normal random numbers and a plurality of exponential random numbers.

(Generation of Normal Random Number by Orthogonal Transformation)

It is assumed that each of the pseudo-random numbers (the aforementioned $x_0$ to $x_{n-1}$) generated by the pseudo-random number generation circuit 11 is a random variable having a mean of 0 and a variance of $\sigma^2$, and having no first-order correlation with one another. When a plurality of pseudo-random numbers is taken as x, and an orthogonal transformation result for x is taken as y (x and y are column vectors), y is expressed by Formula (1) given below.

[Math. 1]

$$y = Px \quad (1)$$

In Formula (1), P is an orthogonal transformation matrix. A mean $m_y$ of y (a column vector consisting of the mean of each random variable) is expressed by Formula (2) given below.

[Math. 2]

$$m_y = (m_{yi}) = <y> = <Px> = Pm_x = 0 \quad (2)$$

The second term from the left in Formula (2) indicates the mean of each random variable in the column vector y. As expressed in Formula (2), the mean $m_y$ is a mean $<y> = <Px>$ of Formula (1), and is expressed as $Pm_x$. Note that $m_x$ is a column vector consisting of the mean of each random variable of x, and as described above, since the mean of each random variable of x is 0, $m_y$ equals 0 (column vector).

A variance $S_y^2$ of y is expressed by Formula (3) given below.

[Math. 3]

$$S_y^2 = (\sigma_{yiyj}) = <yy^T> = <Pxx^TP^T> = PS_x^2P^T = \sigma^2PP^T = \sigma^2I \quad (3)$$

$S_y^2$ is expressed by a covariance matrix, and the second term from the left in Formula (3) represents a covariance of $y_i$ and $y_j$, which are random variables of y. In the case of $x_0$ to $x_{n-1}$, a relation of i, j=0 to n−1 holds. This covariance matrix is expressed as an expected value $<yy^T>$ as in Formula (3), and comes to be an expected value $<Pxx^TP^T>$ from Formula (1). $<xx^T>$ comes to be $S_x^2$, which is a covariance matrix for x. Since the variance of each random variable of x is $\sigma^2$ as discussed above and is independent, $S_x^2$ equals $\sigma^2I$ and $PP^T$ becomes a unit matrix I; as a result, $S_y^2$ becomes equal to $\sigma^2I$.

Therefore, each random variable of y, which is orthogonal transformation with respect to x, is a random variable having no first-order correlation with one another (because components other than diagonal components (covariance) of $S_y^2$ as a covariance matrix become 0), and having a mean of 0 and a variance of $\sigma^2$.

By selecting suitable orthogonal transformation, the random variables obtained in this manner become a linear sum of a large number of random variables. Since the absolute value of a coefficient of the linear sum is not necessarily the same, the precondition for the central limit theorem is not correctly satisfied. However, it is thought of that the same principle basically holds. Accordingly, as the number of random variables of x increases, each random variable of y obtained is expected to be more normally distributed.

Hereinafter, a case will be described in which Hadamard transformation is performed on a uniform random number having a mean of 0 for the sake of simplicity.

Hadamard transformation for two variables is expressed by Formula (4) given below.

[Math. 4]

$$\begin{pmatrix} y_0 \\ y_1 \end{pmatrix} = \frac{1}{\sqrt{2}} \begin{pmatrix} 1 & -1 \\ 1 & 1 \end{pmatrix} \begin{pmatrix} x_0 \\ x_1 \end{pmatrix} \quad (4)$$

Figure 4:
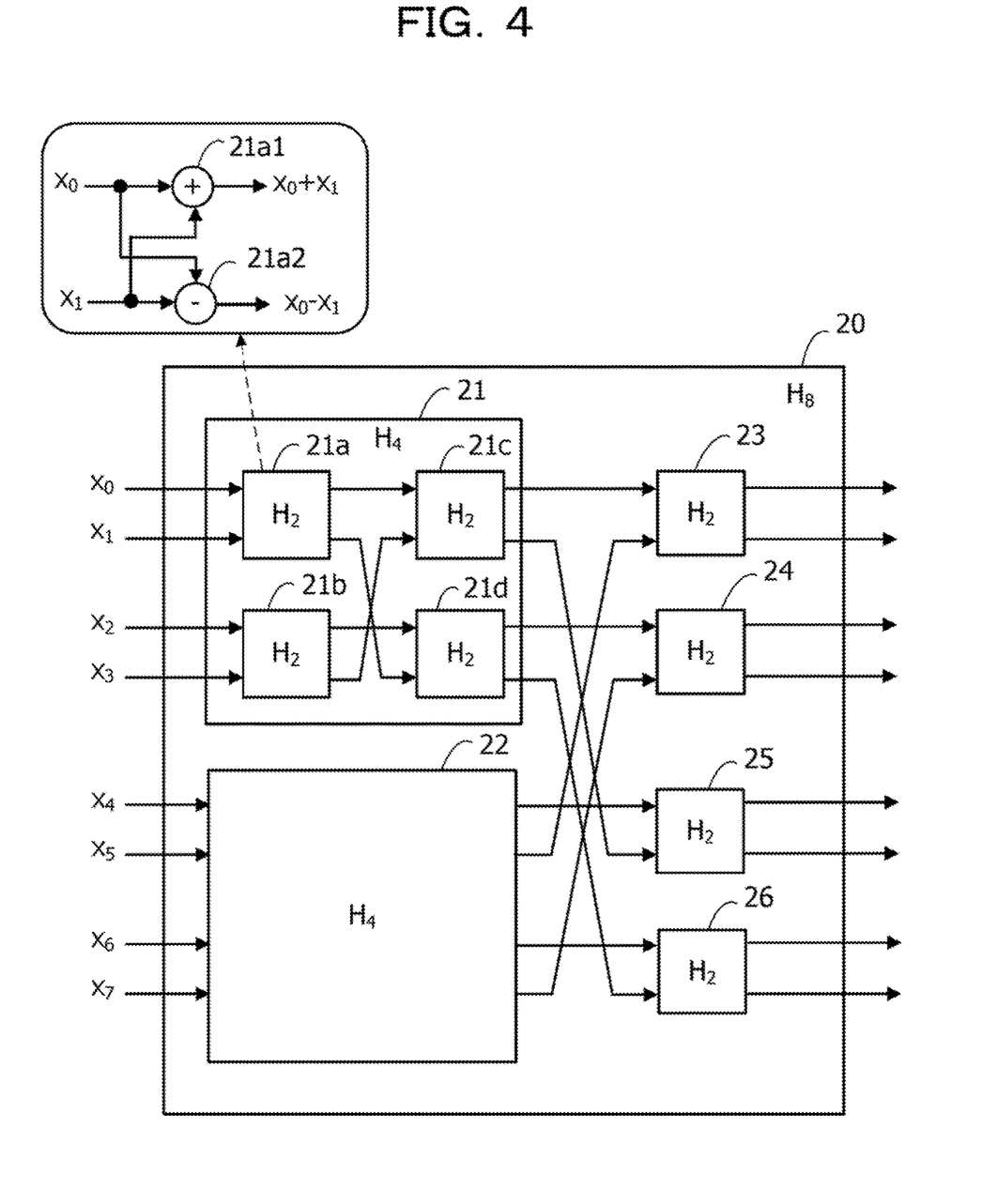
FIG. 4 is a diagram illustrating an example of an orthogonal transformation circuit configured to be inputted with a power of 2 pieces of uniform random numbers.

When the number of uniform random numbers, which is the number of inputs to the orthogonal transformation, is the m-th power of 2, it is possible to obtain Hadamard transformation for the m-th power of 2 pieces of uniform random numbers, by repeating Hadamard transformation in m stages in a similar manner by $2^{m-1}$ times per stage (see FIG. 4). This operation is substantially the same as the fast Fourier transform, but is different in a point that the same operation is carried out in each stage because there is no phase rotation factor.

In order to reduce the amount of hardware to carry out arithmetic operations of the Hadamard transformation, it is desirable to omit "one over the square root of 2" as in Formula (5) given below. In this case, the variance at the output in each stage is doubled with respect to the output by the Hadamard transformation based on Formula (4), so that the operation by a single unit is not exactly called an orthogonal transformation, but the variance may be adjusted by providing a circuit configured to multiply the final output by an appropriate constant as requested. Accordingly, since it seems that no problem arises even when this transformation is referred to as orthogonal transformation, the stated transformation is also referred to in the same manner in the following description.

[Math. 5]

$$\begin{pmatrix} y_0 \\ y_1 \end{pmatrix} = \begin{pmatrix} 1 & -1 \\ 1 & 1 \end{pmatrix} \begin{pmatrix} x_0 \\ x_1 \end{pmatrix} \quad (5)$$

The random variables obtained after repeating the orthogonal transformation according to Formula (5) are random variables obtained by all the source random variables being multiplied by 1 or −1 and added. Since the distribution of a uniform random number with a mean of 0 multiplied by −1 is the same as the source distribution, the obtained random variable corresponds to a sum of a large number of random variables having the same distribution, and it is possible to apply the central limit theorem thereto as it is. Therefore, the random variable obtained approaches the normal distribution as the number of source random variables (uniform random numbers) increases.

The variance of a pseudo normal distribution obtained by adding $2^m$ pieces of uniform random numbers, each of which is an integer of binary n bits, is $2m(2^{2n}-1)/12$, and its amount of information is approximately $n+(m/2)+(½)(\log 2(ne(1-2^{-2n})/6)$. Therefore, in the case where m is large enough, even when n equals 1, for example, a two-value random number is used, it is possible to obtain a normal random number with sufficient precision (resolution).

It is difficult to correctly estimate the amount of information of an exponential random number obtained as a sum of squares of two normal random numbers. However, considering that the number of pairs of integers having the same sum of squares is small, it is estimated that the amount of information is approximately doubled to be 2n+m−3 bits, and an exponential random number with sufficient precision (resolution) Is considered to be obtained.

(Example of Pseudo-Random Number Generated by Pseudo-Random Number Generation Circuits 11 and 11a, and Example of Pseudo-Random Number Generation Circuits 11 and 11a)

Since the random number generation devices 10a to 10c Illustrated in FIGS. 1 to 3 generate normal random numbers using the above-described central limit theorem, when the number of normal random numbers to be outputted is large, the precision of the normal random numbers is hardly affected by the distribution of the pseudo-random numbers generated by the pseudo-random number generation circuits 11 and 11a. Because of this, a two-value random number may be used as a pseudo-random number. However, when the number of normal random numbers to be outputted is relatively small, it is also effective to use a uniform random number using a plurality of bits to enhance the precision of the normal random numbers to be obtained (to increase the amount of information).

As the pseudo-random number generation circuits 11 and 11a configured to generate a two-value random number or a uniform random number, for example, the Mersenne Twister known as a random number generator to generate a high-quality random number may be used. The output of the Mersenne Twister may be divided into portions of one bit or several bits each, and the divided portions may be inputted to the orthogonal transformation circuit 12 and 12a. However, when addition and subtraction of a number of uniform random numbers are performed, since a request for the quality of the uniform random numbers is low, it is considered that a normal random number with sufficient precision may be generated even when a simple LFSR is used as the pseudo-random number generation circuits 11 and 11a. The pseudo-random number generation circuits 11 and 11a may be a single random number generator, or may be configured of a plurality of random number generators with different random number seeds.

The pseudo-random number generation circuit 11 generates the same number of uniform random numbers as the number of normal random numbers requested, and sets each bit of the generated uniform random numbers as input to the orthogonal transformation circuit 12. The pseudo-random number generation circuit 11a generates a smaller number of uniform random numbers than the number of normal random numbers requested, and sets each bit of the generated uniform random numbers as input to the orthogonal transformation circuit 12a. In the case where the number of uniform random numbers simultaneously inputted to the orthogonal transformation circuits 12 and 12a is large, normal random numbers with sufficient precision may be obtained even by using two-value random numbers as the uniform random numbers, as described above.

In the above description, the mean of pseudo-random numbers inputted to the orthogonal transformation circuit is assumed to be 0. However, the mean of binary-integer pseudo-random numbers obtained by the Mersenne Wister, LFSR, or the like is not 0. However, this hardly raises a problem due to the following reason. The normal random numbers obtained by (a multiple of a fixed number of) the Hadamard transformations are a sum of the inputted pseudo-random numbers multiplied by ±1. However, except for one of the normal random numbers ($y_0$ in the case of using the following circuit examples), the number of normal random numbers with a coefficient of +1 is the same as the number of normal random numbers with a coefficient of −1, whereby the mean values of the source pseudo-random numbers are canceled out. Therefore, when the value of a product of the mean value and the number of pseudo-random numbers is subtracted only from the normal random number in which all the coefficients are +1 ($y_0$ in the case of using the following circuit examples), it is possible to remove the influence of the mean values.

(Example of Orthogonal Transformation Circuits 12 and 12a)

An example of the orthogonal transformation circuits 12 and 12a described below uses a circuit configured to perform Hadamard transformation, which is easiest to implement and most effective as orthogonal transformation (because it is possible to apply the central limit theorem as it is), but other circuits configured to perform orthogonal transformation may also be used.

In the case where there is no first-order correlation between a plurality of uniform random numbers inputted to the orthogonal transformation circuits 12 and 12a as discussed above, there is also no first-order correlation between a plurality of normal random numbers generated by the orthogonal transformation, but the generated random numbers are not completely independent. However, the order of the correlation remaining between the plurality of normal random numbers to be generated is significantly high, and therefore the remaining correlation may be considered to be unproblematic in practical use.

The original orthogonal transformation circuit preserves the variance of the inputted uniform random numbers, but as described above, in order to reduce the amount of hardware, it is desirable to provide a circuit configured to perform Hadamard transformation in which one over the square root of 2 is omitted as in the above Formula (5). In the following description, an example of an orthogonal transformation circuit will be explained in which combined are circuits that perform a two-variable Hadamard transformation with one over the square root of 2 being omitted (arithmetic operations of a two-variable Hadamard transformation multiplied by the square root of 2).

FIG. 4 is a diagram illustrating an example of an orthogonal transformation circuit configured to be inputted with a power of 2 pieces of uniform random numbers.

FIG. 4 illustrates an example of an orthogonal transformation circuit 20 (denoted as He) configured to perform Hadamard transformation for $2^3$ variables (uniform random numbers ($x_0$ to $x_7$)). The orthogonal transformation circuit 20 includes Hadamard transformation circuits 21 and 22 (denoted as $H_4$) each configured to perform Hadamard transformation for four variables, and Hadamard transformation circuits 23, 24, 25, and 26 (denoted as $H_2$) each configured to perform Hadamard transformation for two variables.

The Hadamard transformation circuit 21 includes Hadamard transformation circuits 21a, 21b, 21c, and 21d each configured to perform Hadamard transformation of two variables. The Hadamard transformation circuit 21a outputs a sum of two variables ($x_0$, $x_1$) to be inputted and a difference between them. In order to perform such an arithmetic operation, the Hadamard transformation circuit 21a includes an adder 21a1 and a subtractor 21a2. The other "$H_2$"s (the Hadamard transformation circuits 21b, 21c, 21d, 23, 24, 25, and 26) similarly include an adder and a subtractor. The Hadamard transformation circuit 21b outputs a sum of two variables ($x_2$, $x_3$) to be inputted and a difference between them. The Hadamard transformation circuit 21c outputs a sum of one of two output values of the Hadamard transformation circuit 21a and one of two output values of the Hadamard transformation circuit 21b, and a difference between them. The Hadamard transformation circuit 21d outputs a sum of the other one of the two output values of the Hadamard transformation circuit 21a and the other one of the two output values of the Hadamard transformation circuit 21b, and a difference between them.

The Hadamard transformation circuit 22 has the same circuit configuration as that of the Hadamard transformation circuit 21.

The Hadamard transformation circuit 23 outputs a sum of one output value of the Hadamard transformation circuit 21 and one output value of the Hadamard transformation circuit 22, and a difference between them. The Hadamard transformation circuit 24 outputs a sum of a value of one output of the Hadamard transformation circuit 21 (other than those inputted to the Hadamard transformation circuit 23) and a value of one output of the Hadamard transformation circuit 22 (other than those inputted to the Hadamard transformation circuit 23), and a difference between them. The Hadamard transformation circuit 25 outputs a sum of a value of one output of the Hadamard transformation circuit 21 (other than those inputted to the Hadamard transformation circuits 23, 24) and a value of one output of the Hadamard transformation circuit 22 (other than those inputted to the Hadamard transformation circuits 23, 24), and a difference between them. The Hadamard transformation circuit 26 outputs a sum of a value of one output of the Hadamard transformation circuit 21 (other than those inputted to the Hadamard transformation circuits 23, 24, 25) and a value of one output of the Hadamard transformation circuit 22 (other than those inputted to the Hadamard transformation circuits 23, 24, 25), and a difference between them.

The wire connection of the above-discussed orthogonal transformation circuit 20 is exemplary, and two outputs of each "$H_2$" in each stage other than the last stage are inputted to different "$H_2$"s in a subsequent stage. It is desirable that two inputs of "$H_2$" in each stage are outputs of the Hadamard transformation circuits of different blocks of the previous stage. For example, in the example of FIG. 4, two inputs of the Hadamard transformation circuit 23 are outputs of different blocks of the previous stage (the Hadamard transformation circuits 21 and 22). Although orthogonality (a situation in which no first-order correlation is present) between a plurality of generated normal random numbers is secured without having the above-discussed configuration, it is desirable to have the configuration discussed above in order to generate high-precision normal random numbers in which a larger number of uniform random numbers are related.

In the case where the orthogonal transformation circuits 12 and 12a illustrated in FIGS. 1 to 3 perform orthogonal transformation on the m-th power of 2 pieces of uniform random numbers (in the example of FIG. 4, m=3), the intended transformation may be achieved by a combination of "$H_2$"s in m stages as described above, where $2m$ pieces of "$H_2$"s are provided per stage.

Figure 5:
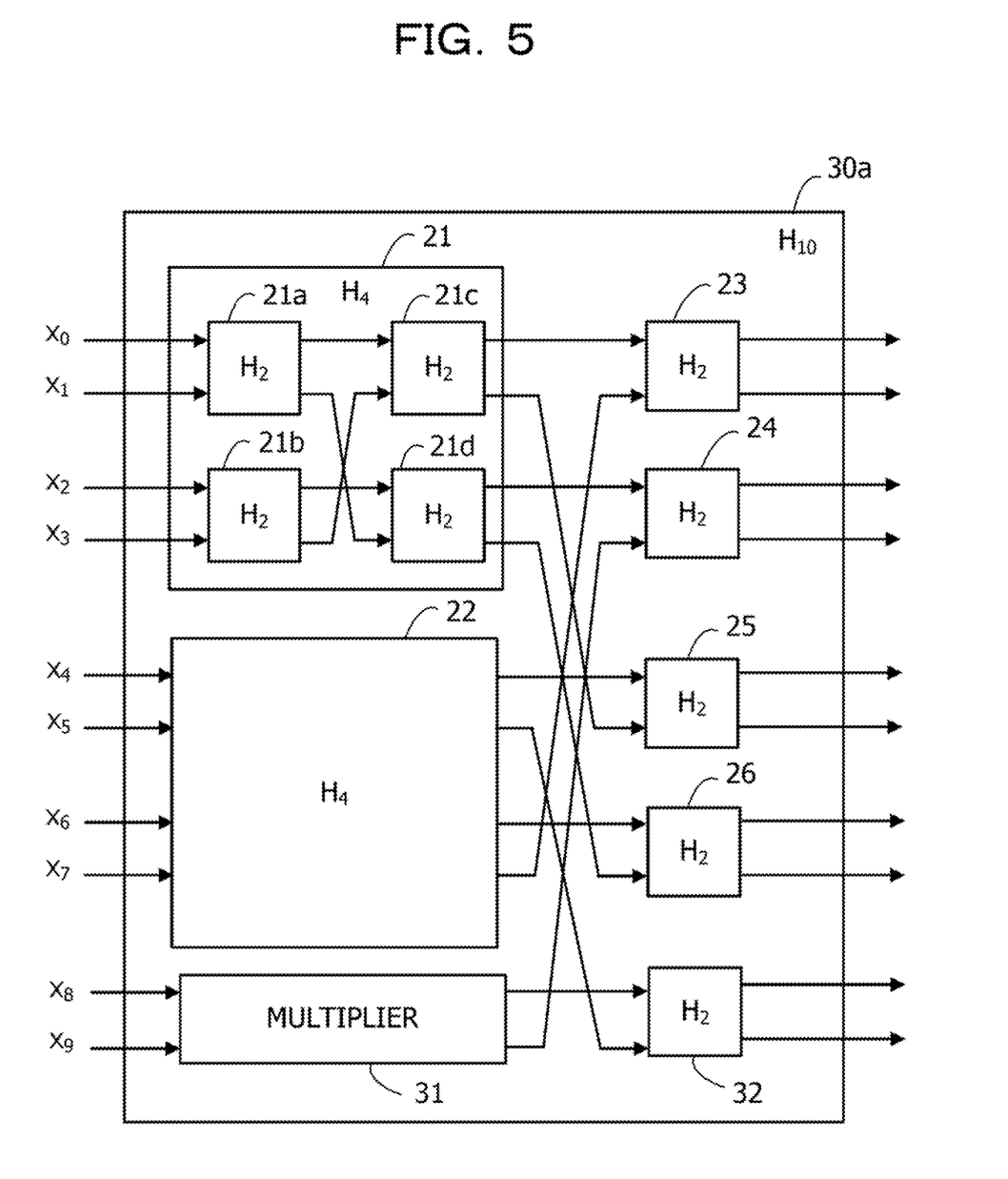
FIG. 5 is a diagram illustrating an example of an orthogonal transformation circuit configured to be inputted with not a power of 2 pieces of uniform random numbers (case 1).
Figure 6:
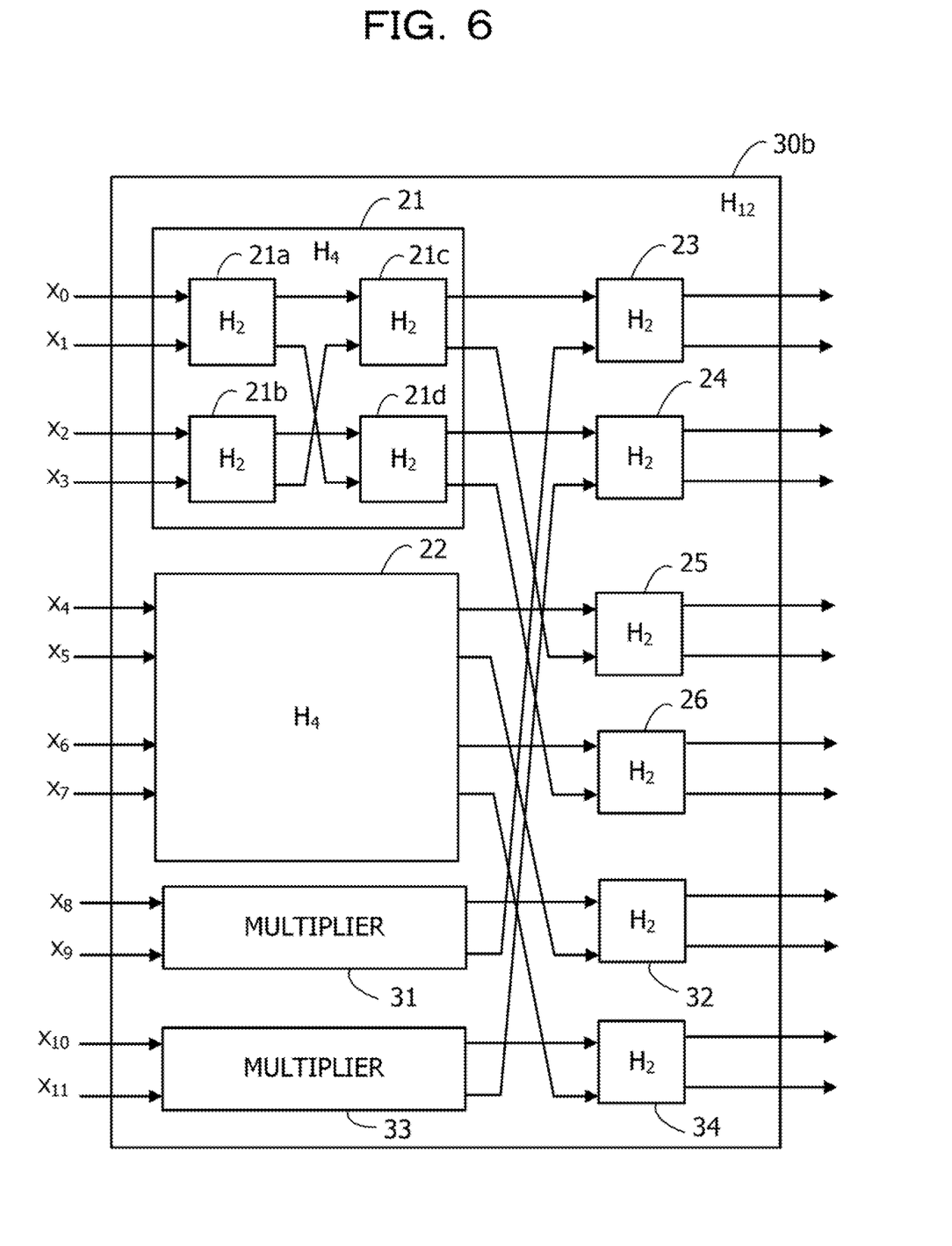
FIG. 6 is a diagram illustrating an example of an orthogonal transformation circuit configured to be inputted with not a power of 2 pieces of uniform random numbers (case 2).

FIGS. 5 and 6 are diagrams each illustrating an example of an orthogonal transformation circuit configured to be inputted with not a power of 2 pieces of uniform random numbers. In FIGS. 5 and 6, the same constituent elements as those illustrated in FIG. 4 are assigned the same reference numerals.

FIG. 5 illustrates an example of an orthogonal transformation circuit 30a (denoted as $H_{10}$) configured to perform orthogonal transformation with respect to 10 variables (uniform random numbers ($x_0$ to $x_9$)). The orthogonal transformation circuit 30a includes, in addition to the constituent elements illustrated in FIG. 4, a multiplier 31 and a Hadamard transformation circuit 32 configured to perform Hadamard transformation of two variables.

The multiplier 31 doubles each value of two variables ($x_8$, $x_9$) corresponding to a remainder of the calculation of $10/2^3$. Two outputs (multiplication results) of the multiplier 31 are supplied to any two of "$H_2$"s in the third stage (the Hadamard transformation circuits 23 to 26, and 32). In the example of FIG. 5, the two outputs of the multiplier 31 are supplied to the Hadamard transformation circuits 24 and 32. In the case where a Hadamard transformation circuit configured to carry out arithmetic operations of a two-variable Hadamard transformation multiplied by the square root of 2 is used, variance per stage is doubled. In the example of FIG. 5, in order to adjust the variance of input to "$H_2$" in the third stage, there is used the multiplier 31 configured to double the values (amplitude) of two variables to obtain a fourfold variance, which corresponds to the amount of variance of "$H_2$"s in two stages.

Among the Hadamard transformation circuits 23 to 26, and 32, those to which the outputs of the multiplier 31 are supplied (in the example of FIG. 5, the Hadamard transformation circuits 24 and 32) each output a sum of the output value of the multiplier 31 and one of the four output values of the Hadamard transformation circuits 21 and 22 and a difference between them.

FIG. 6 illustrates an example of an orthogonal transformation circuit 30b (denoted as $H_{12}$) configured to perform orthogonal transformation with respect to 12 variables (uniform random numbers ($x_0$ to $x_j$)). The orthogonal transformation circuit 30b includes, in addition to the constituent elements illustrated in FIG. 5, a multiplier 33 and a Hadamard transformation circuit 34 configured to perform Hadamard transformation of two variables.

Each of the multipliers 31 and 33 doubles two values of four variables ($x_8$ to $x_{11}$) corresponding to a remainder of the calculation of $12/2^3$. In the example of FIG. 6, the multiplier 31 doubles each of $x_8$ and $x_9$, and the multiplier 33 doubles each of $x_{10}$ and $x_{11}$. Two outputs (multiplication results) of each of the multipliers 31 and 33 are supplied to any two of "$H_2$"s in the third stage (the Hadamard transformation circuits 23 to 26, 32, and 34). In the example of FIG. 6, the two outputs of the multiplier 31 are supplied to the Hadamard transformation circuits 23 and 32, and the two outputs of the multiplier 33 are supplied to the Hadamard transformation circuits 24 and 34.

Among the Hadamard transformation circuits 23 to 26, 32, and 34, those to which the outputs of the multipliers 31 and 33 are supplied (in the example of FIG. 6, the Hadamard transformation circuits 23, 24, 32, and 34) each output a sum of the output value of the multiplier 31 or 33 and one of the four output values of the Hadamard transformation circuits 21 and 22 and a difference between them.

The wire connections of the above-described orthogonal transformation circuits 30a and 30b are exemplary, and it is desirable that the two outputs of a previous stage inputted to "$H_2$"s in each stage are outputs of the Hadamard transformation circuits of different blocks of the previous stage, for the same reason as described above.

Since each output of the multipliers 31 and 33 is a multiple of one variable, in order to generate normal random numbers with high precision in which a larger number of uniform random numbers are related, it is desirable that the wire connections are carried out in such a manner as not to cause the outputs of the multipliers 31 and 33 to be two inputs to the same Hadamard transformation circuit among the Hadamard transformation circuits 23 to 26, 32, and 34. In the case where "$H_2$"s are orthogonal transformation circuits of more stages than "$H_2$"s in FIGS. 5 and 6, it is desirable that the wire connection is carried out in such a manner as not to cause the Hadamard transformation results using the outputs of the multipliers 31 and 33 to be two inputs to the same Hadamard transformation circuit even at a near stage in the fourth and subsequent stages.

The orthogonal transformation circuits 12 and 12a illustrated in FIGS. 1 to 3 may be achieved by, for example, a combination of the plurality of "$H_2$"s and the multipliers as described above in the case where the orthogonal transformation with respect to not a power of 2 pieces of uniform random numbers is to be performed.

(Modification Example of Random Number Generation Device Configured to Generate Exponential Random Number)

As illustrated in FIGS. 2 and 3, an exponential random number is obtained by taking the sum of squares of two normal random numbers. In the case where the orthogonal transformation circuits 12 and 12a are achieved by using "$H_2$"s in a plurality of stages as described above, when two inputs of a certain "H" among the plurality of "$H_2$"s in the last stage are defined as $x_1$ and $x_j$, two outputs are represented as $x_1+x_j$ and $x_1-x_j$. The sum of squares of these two outputs is represented by an equation of $(x_i+x_j)^2+(x_i-x_j)^2=2(x_i^2+x_j^2)$. On the other hand, the sum of squares of the two inputs ($x_i$, $x_j$) is represented as $x_i^2+x_j^2$. For example, even when "$H_2$" of the last stage is not present, it is possible to obtain the same exponential random number except that the mean value is halved.

Figure 7:
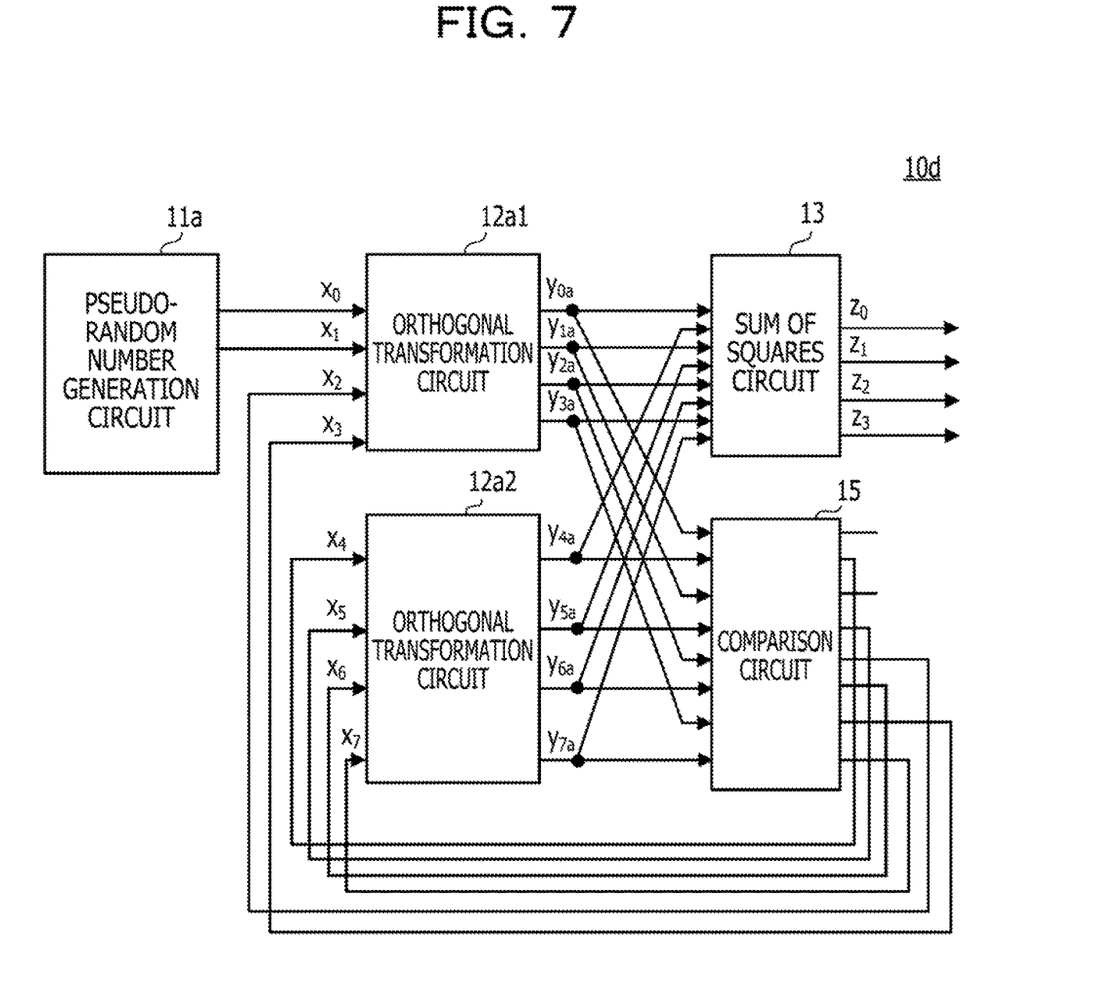
FIG. 7 is a diagram illustrating a modification example of a random number generation circuit configured to generate an exponential random number.

FIG. 7 is a diagram illustrating a modification example of a random number generation circuit configured to generate an exponential random number. In FIG. 7, the same constituent elements as those illustrated in FIG. 3 are assigned the same reference numerals.

In a random number generation device 10d, when the orthogonal transformation circuit 12a illustrated in FIG. 3 is implemented by using "$H_2$"s in a plurality of stages, a plurality of "$H_2$"s in the last stage is omitted. Orthogonal transformation circuits 12a1 and 12a2 included in the random number generation device 10d correspond to, for example, the Hadamard transformation circuits 21 and 22 illustrated in FIG. 4.

The orthogonal transformation circuit 12a1 outputs four variables ($y_{0a}$, $y_{1a}$, $y_{2a}$, and $y_{3a}$) obtained by performing orthogonal transformation on four variables (uniform random numbers ($x_0$ to $x_3$)).

The orthogonal transformation circuit 12a2 outputs four variables ($y_{4a}$, $y_{5a}$, $y_{6a}$, and $y_{7a}$) obtained by performing orthogonal transformation on four variables (uniform random numbers ($x_4$ to $x_7$)).

The sum of squares circuit 13 outputs four exponential random numbers ($z_0$ to $z_3$) by computing a sum of squares of the variables outputted by the orthogonal transformation circuit 12a1 and the variables outputted by the orthogonal transformation circuit 12a2.

For example, equations of $z_0=y_{0a}^2+y_{4a}^2$, $z_1=y_{4a}^2+y_{5a}^2$, $z_2=y_{2a}^2+y_{6a}^2$, and $z_3=y_{3a}^2+y_{7a}^2$ hold.

A comparison circuit 15 outputs a comparison result of magnitudes of two variables used for the calculation of each exponential random number. For example, the comparison circuit 15 outputs a value of 1 when $y_{0a} \geq y_{4a}$ or a value of 0 when $y_{0a} < y_{4a}$ as a comparison result of $y_{0a}$ and $y_{4a}$ used for the calculation of $z_0$. This operation is the same as the determination of the sign (positive/negative) of ($y_{0a}-y_{4a}$). An operation in which the comparison circuit 15 outputs a value of 1 when $y_{0a} \geq -y_{4a}$ or a value of 0 when $y_{0a} < -y_{4a}$ as a comparison result of y and $-y_{4a}$, is the same as the determination of the sign of ($y_{0a}+y_{4a}$). For example, the comparison circuit 15 executes a similar function to the function of the sign determining circuit 14a illustrated in FIG. 3.

Some of the comparison results outputted by the comparison circuit 15 are inputted as uniform random numbers to the orthogonal transformation circuits 12a1 and 12a2. In the example of FIG. 7, two of the eight comparison results are inputted to the orthogonal transformation circuit 12a1 as the uniform random numbers ($x_2$ and $x_3$), and four of them are inputted to the orthogonal transformation circuit 12a2 as the uniform random numbers ($x_4$ to $x_7$).

In the random number generation device 10d as described above, since it is possible to omit the plurality of "$H_2$"s in the last stage, the amount of hardware may be further suppressed.

The normal random numbers and the exponential random numbers do not have a first-order correlation, but are not independent from each other because the exponential random numbers are generated based on the normal random numbers. Accordingly, whether the use of both the normal random numbers and the exponential random numbers raises a problem seems to depend on applications.

Note that the random number generation device 10c in FIG. 3, the random number generation device 10d in FIG. 7, and the like utilize information that is not used in the random number generation device 10*b* in FIG. 2. In the random number generation device 10*b*, when a plane with respect to two normal random numbers inputted to the sum of squares circuit 13 is considered, the sum of squares is generated by using only the information in the radial direction, and the information in the angle direction is not used. Since this information is independent of the sum of squares, it may be possible to take out and use the information. For example, since signals of two bits are obtained by taking out the information (signs) of two normal random numbers, when these signals are subjected to feedback and used as input for generating the next normal random number, there is a possibility that a circuit for generating a uniform random number is not requested.

However, the normal random number generated only from the feedback signals may have a relatively short period. In order to avoid this, the random number generation device 10*c* in FIG. 3, the random number generation device 10*d* in FIG. 7, and the like generate the next normal random number and exponential random number by using the determination results outputted by the sign determining circuit 14*a*, some of the comparison results outputted by the comparison circuit 15, the pseudo-random number generated by the pseudo-random number generation circuit 11*a*, and the like.

The random number generation devices 10*c* and 10*d* are devices based on the viewpoint of reusing the information independent of the exponential random number as described above, but may also be used as normal random number generators. However, there is a possibility that some correlation occurs between normal random numbers generated at different times.

The plurality of exponential random numbers generated as described above may be used in an optimization device configured to solve a discrete optimization problem by using a digital circuit, or the like. The optimization device searches for, for example, a combination of values of state variables in which the value of an evaluation function (also referred to as an energy function) is minimized. In the optimization device, a change in value of an evaluation function (energy change) when a value of each state variable changes is calculated, and a change in state variable (state transition) is allowed with a predetermined probability in order to suppress a situation in which the solution is trapped in a local solution even when the calculated energy change is positive. The determination as to whether to allow the state variable change may be made based on a comparison result of the energy change and exponential random numbers. As the number of state variables increases (the magnitude of a problem increases), the number of exponential random numbers used also increases.

Moreover, a plurality of exponential random numbers, a plurality of normal random numbers, and the like may be applied to various devices configured to perform, for example, numerical calculation, optimization, and simulation by using a Monte Carlo method or the like.

Although aspects of the random number generation device and the random number generation method of the disclosure have been described thus far based on the embodiments, these are merely examples and are not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A random number generation device comprising:
   a pseudo-random number generation circuit configured to generate a plurality of first pseudo-random numbers;
   an orthogonal transformation circuit configured to generate a plurality of normal random numbers by performing orthogonal transformation on the plurality of first pseudo-random numbers, or by performing orthogonal transformation on the plurality of first pseudo-random numbers and a second pseudo-random number; and
   a sum of squares circuit configured to generate exponential random numbers that are half in number of the plurality of normal random numbers by calculating a sum of squares for two each of the plurality of normal random numbers.

2. The random number generation device according to claim 1, wherein the pseudo-random number generation circuit generates the plurality of first pseudo-random numbers that have no first-order correlation with one another.

3. The random number generation device according to claim 1, further comprising:
   a sign determining circuit configured to output a plurality of determination results obtained by determining a sign of each of the plurality of normal random numbers, wherein the orthogonal transformation circuit performs orthogonal transformation on the second pseudo-random number, which is part of determination results among the plurality of determination results, and on the plurality of first pseudo-random numbers.

4. The random number generation device according to claim 1, wherein the orthogonal transformation circuit generates the plurality of normal random numbers by Hadamard transformation as the orthogonal transformation.

5. The random number generation device according to claim 1, wherein, when a number of the plurality of first pseudo-random numbers or the number of inputs to the orthogonal transformation circuit, which is a sum of the number of the plurality of first pseudo-random numbers and the number of the second pseudo-random number, Is an m-th power of 2 (m is a natural number equal to or greater than 2), the orthogonal transformation circuit includes Hadamard transformation circuits in m stages, where each Hadamard transformation circuit carries out arithmetic operations of a two-variable Hadamard transformation multiplied by a square root of 2, and the number of the Hadamard transformation circuits per stage is the (m−1)-th power of 2 pieces of 2, and two outputs of each Hadamard transformation circuit in each stage other than the last stage are inputted to different Hadamard transformation circuits in a subsequent stage.

6. The random number generation device according to claim 1, wherein, when the number of the plurality of first pseudo-random numbers or the number of inputs to the orthogonal transformation circuit, which is a sum of the number of the plurality of first pseudo-random numbers and the number of the second pseudo-random number, is not a power of 2, the orthogonal transformation circuit includes a multiplication circuit configured to double, among the plurality of first pseudo-random numbers or the second pseudo-random numbers, the pseudo-random numbers of the number corresponding to a remainder obtained when the number of inputs is divided by a power of 2, and Hadamard transformation circuits in a plurality of stages, where each Hadamard transformation circuit carries out arithmetic operations of a two-variable Hadamard transformation multiplied by the square root of 2, and two outputs of each Hadamard transformation circuit in each stage other than the last stage are inputted to different Hadamard transformation circuits in a subsequent stage, and output of the multiplication circuit is inputted to any one of the Hadamard transformation circuits in a third stage.

7. A random number generation method comprising:
generating a plurality of first pseudo-random numbers by a pseudo-random number generation circuit;
generating a plurality of normal random numbers by an orthogonal transformation circuit performing orthogonal transformation on the plurality of first pseudo-random numbers or on the plurality of first pseudo-random numbers and a second pseudo-random number; and
generating exponential random numbers that are half in number of the plurality of normal random numbers by calculating a sum of squares for two each of the plurality of normal random numbers.

8. A random number generation device comprising:
a pseudo-random number generation circuit configured to generate a plurality of first pseudo-random numbers;
an orthogonal transformation circuit configured to generate a plurality of normal random numbers by performing orthogonal transformation on the plurality of first pseudo-random numbers, or by performing orthogonal transformation on the plurality of first pseudo-random numbers and a second pseudo-random number; and
a sign determining circuit configured to output a plurality of determination results obtained by determining a sign of each of the plurality of normal random numbers, wherein the orthogonal transformation circuit performs orthogonal transformation on the second pseudo-random number, which is part of determination results among the plurality of determination results, and on the plurality of first pseudo-random numbers.

* * * * *